US009783301B2

(12) United States Patent
Schliwa et al.

(10) Patent No.: US 9,783,301 B2
(45) Date of Patent: Oct. 10, 2017

(54) HANDLING SYSTEM FOR HANDLING OBJECTS IN A VEHICLE, STORAGE DEVICE AND METHOD FOR HANDLING OBJECTS IN A VEHICLE

(71) Applicant: AIRBUS OPERATIONS GMBH, Hamburg (DE)

(72) Inventors: Ralf Schliwa, Dollern (DE); Homayoun Dilmaghani, Merenvielle (FR); Ulrich Pohl, Ganderkesee (DE); Herbert Steinbeck, Hamburg (DE); Maria Strasdas, Jork (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 162 days.

(21) Appl. No.: 13/623,186

(22) Filed: Sep. 20, 2012

(65) Prior Publication Data

US 2013/0056583 A1 Mar. 7, 2013

Related U.S. Application Data

(63) Continuation of application No. PCT/EP2011/054772, filed on Mar. 29, 2011.
(Continued)

(30) Foreign Application Priority Data

Mar. 29, 2010 (DE) .................. 10 2010 013 219

(51) Int. Cl.
*B64D 11/00* (2006.01)
(52) U.S. Cl.
CPC ................ *B64D 11/0007* (2013.01)
(58) Field of Classification Search
CPC ........ B64D 11/00; B64D 9/00; B64D 11/003; B64D 11/0007; Y02T 50/46
(Continued)

(56) References Cited

U.S. PATENT DOCUMENTS 3,460,686 A * 8/1969 Cole ......................... 414/139.9
3,595,407 A * 7/1971 Muller-Kuhn et al. ....... 414/344
(Continued)

FOREIGN PATENT DOCUMENTS

DE 19620166 A1 11/1997
DE 10204892 A1 8/2003
(Continued)

OTHER PUBLICATIONS

International Searching Authority, International Search Report dated Jun. 22, 2011 for International Application No. PCT/EP2011/054772.
(Continued)

*Primary Examiner* — Assres H Woldemaryam
(74) *Attorney, Agent, or Firm* — Lorenz & Kopf, LLP

(57) ABSTRACT

A handling system for handling objects in a vehicle comprises a storage apparatus that is positionable outside a vehicle cabin, an access device that is positionable in a vehicle cabin, and a transport device for transporting objects between the storage apparatus and the access device. The storage apparatus comprises a storage space and a connection station that is connectable to the transport device, wherein the storage apparatus comprises at least one drive device for moving carriers on which objects to be stored are held. The handling system comprises at least one guiding device that with the drive device guides the carriers on at least one circular path within the storage space. The storage space thus comprises a vertical flat shape that results in a significantly smaller reduction in the available cargo volume in a vehicle, while at the same time maximizing the design space available for passenger seats.

13 Claims, 13 Drawing Sheets

Related U.S. Application Data

(60) Provisional application No. 61/318,613, filed on Mar. 29, 2010.

(58) Field of Classification Search
USPC ........ 244/137.1, 118.1, 118.5; 414/280, 281, 414/286, 269, 273, 277, 786, 661; 186/40, 45, 46, 47, 49
See application file for complete search history.

(56) References Cited

U.S. PATENT DOCUMENTS

| | | | |
|---|---|---|---|
| 3,741,504 A * | 6/1973 | Alberti et al. | 244/137.1 |
| 4,049,135 A * | 9/1977 | Glassmeyer | 414/351 |
| 4,660,787 A | 4/1987 | Sprenger et al. | |
| 5,314,143 A | 5/1994 | Luria | |
| 5,496,000 A | 3/1996 | Mueller | |
| 5,759,005 A * | 6/1998 | Roessner et al. | 414/280 |
| 5,992,797 A * | 11/1999 | Seidel et al. | 244/118.5 |
| 6,059,229 A * | 5/2000 | Luria | 244/118.1 |
| 6,113,031 A * | 9/2000 | Williams et al. | 244/118.1 |
| 6,152,287 A * | 11/2000 | Luria | 198/465.1 |
| 6,340,136 B1 * | 1/2002 | Luria | 244/118.1 |
| 6,557,800 B2 * | 5/2003 | Medina et al. | 244/118.1 |
| 6,659,704 B2 * | 12/2003 | Fukuhara et al. | 414/398 |
| 6,776,263 B2 * | 8/2004 | Gottlieb et al. | 187/251 |
| 6,808,142 B2 * | 10/2004 | Oki | 244/118.1 |
| 7,159,821 B2 * | 1/2007 | Harrington et al. | 244/118.5 |
| 7,584,926 B2 * | 9/2009 | Harrington et al. | 244/118.5 |
| 7,614,585 B2 * | 11/2009 | McCoskey et al. | 244/137.1 |
| 7,845,898 B2 * | 12/2010 | Rawdon et al. | 414/809 |
| 7,931,431 B2 * | 4/2011 | Benedict et al. | 414/281 |
| 8,019,464 B2 | 9/2011 | Hoffjann et al. | |
| 8,286,914 B2 | 10/2012 | Breuer | |
| 2007/0007389 A1 * | 1/2007 | McCoskey et al. | 244/118.5 |
| 2007/0284481 A1 | 12/2007 | Linero | |

FOREIGN PATENT DOCUMENTS

| | | |
|---|---|---|
| EP | 1873059 A2 | 1/2008 |
| WO | 2005/066022 A2 | 7/2005 |

OTHER PUBLICATIONS

State Intellectual Property Office of the People's Republic of China, Office Action for Chinese Patent Application No. 201180017583.3, mailed Apr. 3, 2014.

* cited by examiner

HANDLING SYSTEM FOR HANDLING OBJECTS IN A VEHICLE, STORAGE DEVICE AND METHOD FOR HANDLING OBJECTS IN A VEHICLE

CROSS-REFERENCE TO RELATED APPLICATIONS

This is a continuation of International Application No. PCT/EP/2011/054772, filed Mar. 29, 2011, which claims priority to U.S. Provisional Patent Application No. 61/318,613, filed Mar. 29, 2010 and to German Patent Application No. 10 2010 013 219.5, filed Mar. 29, 2010, which are hereby incorporated by reference in their entirety.

TECHNICAL FIELD

The technical field relates to a handling system for handling objects in a vehicle, comprising a storage apparatus, which is positionable outside a vehicle cabin, for storing objects, an access device, which is positionable in a vehicle cabin, for removing or inserting objects, and a transport device for transporting objects between the storage apparatus and the access device.

The present disclosure further relates to a storage apparatus for storing objects in a vehicle, to a vehicle with a vehicle cabin, a storage apparatus positioned outside the vehicle cabin, an access device positioned in the vehicle cabin, and a transport device for transporting objects between the storage apparatus and the access device. Furthermore, the present disclosure relates to a method for handling objects in a vehicle.

BACKGROUND

A significant objective in the design of passenger cabins in means of transport frequently relates to maximizing the available number of passenger seats, which number is limited by the number of prescribed seats for members of the crew, and furthermore by prescribed safety devices, any supply devices and lavatories. The ratio of the number of passenger seats to remaining devices in passenger cabins is one factor in determining the economic efficiency of an aircraft in regular service. Apart from regulatory requirements relating to type certification and operating certification of means of transport, customer requirements, for example customer-specific special installations by operators of the means of transport, are also to be taken into account in the selection of seat sizes, seat pitch, supply devices and lavatories. Depending on the design of installations in the passenger cabin and their space requirement, intelligent construction solutions and arrangement solutions can optimize the number of passenger seats.

One option for increasing the number of passenger seats in a spatially limited cabin could, for example, be implemented in that containers, for example trolleys, containing food and beverages or other conveyable objects are not stored within the cabin, but instead in a dedicated storage space outside the cabin. For example, DE 102 04 892 B4 discloses a conveyor for the vertical transportation of catering containers in commercial aircraft, in which conveyor such trolleys are stored in an underfloor cargo hold and are moved into the aircraft cabin when required.

On the other hand, a solution is known in which individual objects, for example food and beverages, are stored, without the trolley as a means of transport, in an out-of-the way cargo compartment outside the cabin, and are made available when required. DE 43 02 706 C2 and U.S. Pat. No. 5,496,000 A show such an arrangement for handling food and beverages on board an aircraft, in which arrangement food and beverages packed in catering service boxes are stored in a cargo container and are conveyed to the cabin. Storage robots are used for removing and conveying the individual catering service boxes. In addition, other objects, desirable features and characteristics will become apparent from the subsequent summary and detailed description, and the appended claims, taken in conjunction with the accompanying drawings and this background.

SUMMARY

While common solutions from the state of the art, such as from airplane technology, can increase the number of passenger seats in a vehicle, this generally occurs with the occupation of at least one container parking position in the cargo compartment of the vehicle concerned. Any increase in the passenger capacity of the vehicle is thus associated with a decrease in the possible cargo volume or in the number of container parking spaces.

According to various exemplary aspects of the present disclosure, provided is a device or a system for increasing the passenger capacity of a vehicle while at the same time the largest-possible cargo volume is maintained and at the same time easy handling is ensured.

In one exemplary embodiment, the present disclosure relates to a handling system for handling objects in a vehicle, comprising a storage apparatus, which is positionable outside a passenger cabin, for storing objects, an access device, which is positionable in a vehicle cabin, for removing or inserting objects, and a transport device for transporting objects between the storage apparatus and the access device.

According to various exemplary teachings of the present disclosure, the storage apparatus comprises a storage space with at least one planar frame, wherein the frame comprises at least one connection station that is connectable to the transport device, and wherein the frame comprises at least one drive device for moving carriers on which the objects to be stored are held. The storage apparatus further comprises at least one guiding device that is designed to guide the carriers on at least one circular path within the storage space.

Such a design of a storage apparatus provides an advantage in that, as a result of the circular movement of the carriers, distributed storage of objects on a planar surface is made possible, and in that at any time access to each individual object is ensured. As a result of this design the entire storage space can be designed so as to be relatively flat so that in turn said storage space can be arranged in a planar region directly underneath or directly above a cabin, without, for example, completely occupying a container parking position in a cargo hold of the vehicle.

If the objects to be handled according to the present disclosure are to be transported by means of trolleys, no increased space for already loaded trolleys needs to be provided in the vehicle cabin. Corresponding parking positions for trolleys, which can, for example, be situated in a galley of the vehicle, can be saved, which results in the galley being able to be dimensioned so as to be significantly smaller and to extend over a smaller region of the vehicle cabin. The space saved can be used for accommodating passenger seats in order to, ultimately, increase the seating capacity within the vehicle cabin.

In order to further reduce the size of the galleys, should the objects contain food and beverages, it may be sensible to design the trolleys so that they are foldable so that before and after use they may be stowed in a generally small stowage space. This additionally reduces the required design space for parking positions of trolleys and the like, while additionally increasing the number of passenger seats that may be accommodated.

By guiding the carriers on a circular path intersected by a connection station, all the carriers may be selectively unloaded or loaded at the connection station. Apart from easy access to individual carriers, practically any design, in terms of surface area, of a storage space is possible so that, for example, a very large surface area underneath or above a passenger cabin may be used. As a result of this, the vertical, i.e. height-related, extension of the storage space may, however, be selected so as to be relatively small in order to have as little influence as possible on a taken-up position within the vehicle. Thus, for example in aircraft, it could be possible without further ado to arrange such a storage space underneath a cabin floor without limiting the storage space provided for freight containers; likewise the crown area could comprise such a storage space. In one example, a cargo hold with a storage space contained therein for the objects to be handled could be restricted only to such an extent that complete cargo containers fit into the cargo hold. If this is not practicable because of greater vertical extension of the objects to be handled, the directly adjacent space beneath/underneath/above the storage space could also be designed for receiving baggage, oversize baggage or larger objects in general, which should anyway be able to be accommodated in commonly-used larger vehicles.

The term "frame" is to be interpreted in the broadest sense as a unit that makes it possible to provide a structurally stable storage space with predetermined dimensions. In this arrangement the frame could, for example, be designed as a rack, a housing, connection points or the like, relative to which the objects to be handled move.

The handling system according to the present disclosure provides a further advantage in that a larger capacity of objects may be accommodated and handled than is possible in a hitherto usually provided cabin space. This would be advantageous to the operators of the vehicle in terms of catering time and catering costs.

Furthermore, the handling system according to the various teachings of the present disclosure may provide return transport of objects, for example to make it possible to remove waste from the cabin and to store said waste. Up to now it has been common practice, for example in commercial aircraft, to stow waste in waste bags, which in some cases due to the limited space available need to be stored in lavatories.

Since some objects, even if only a very small fraction of them, may continue to be accommodated in the cabin, an emergency supply to passengers could be ensured.

An access device as an interface between the storage apparatus and the vehicle cabin could generally be designed so that objects may be stopped at various predeterminable positions in order to be able to slide the objects, for example directly, into various compartments or drawers of trolleys or the like, so as to obviate the need for any lifting.

Centrally storing objects in a single storage apparatus may, furthermore, save time for loading objects, for example food and beverages, into the vehicle, because catering vehicles need to unload their goods generally at a single point instead of, for example in the case of commercial aircraft, having to drive to several aircraft doors in order to load the goods into galleys situated at those points.

Finally, central refrigeration of objects to be refrigerated can provide an advantage because it obviates the need for providing expensive refrigerating devices, coolant lines and the like within the vehicle cabin.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
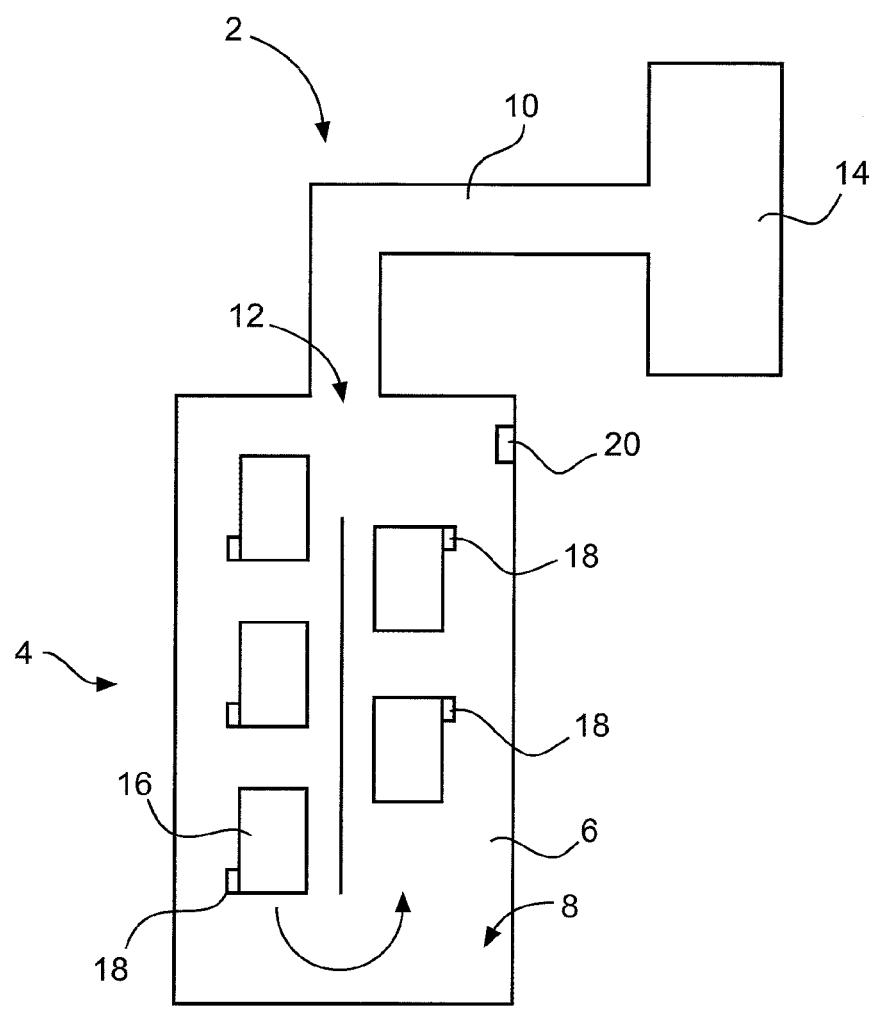
FIG. 1 shows a diagrammatic view of an exemplary handling system.

According to FIG. 1 the handling system 2 according to the various teachings of the present disclosure comprises a storage apparatus 4 with a storage space 6 and a planar frame 8, wherein the frame 8 comprises a connection station 12 connected to a transport device 10, by means of which connection station 12 a connection between the storage space 6 and an access device 14 is created.

The special feature of the handling system 2 according to the various teachings of the present disclosure comprises the storage apparatus 4 being designed to move carriers 16, which are designed to carry objects to be stored and to be conveyed, on at least one circular path within the storage space 6. In this arrangement the circular path encompasses a movement of the carriers 16 past the connection station 12 so that the transport device 10 by way of the connection station 12 is generally always in a position to wait for the approach of a predetermined carrier 16 to the connection station 12, and to convey the object situated on the aforesaid to the access device 14, to convey the entire predetermined carrier 16 to the transport device 10, to convey an object from the access device 14 to a predetermined empty or only incompletely taken up predetermined carrier 16, or to convey a predetermined carrier 16 to the storage space 6.

It is understood, for maintaining special energy efficiency on board the vehicle and in order to save resources generally, to carry out rotary movement of the carriers 16 in the storage space 6 typically only at those times when access to objects or carriers 16 within the storage space 6 is to take place.

Generally, the individual carriers 16 comprise a marking means 18 that may be recognized by a mark recognition device 20, wherein the mark recognition device 20 is generally situated in a region adjacent to the connection station 12. Accordingly, if a predetermined carrier 16 that comprises an individual marking means 18 is desired, a common movement of all the carriers within the storage space 6 could be initiated. The mark recognition device 20 would then recognize the approach of the predetermined carrier 16 to the connection station 12 and subsequently initiate deceleration of all the carriers 16 so that the predetermined carrier 16 is positioned directly at the connection station 12. At this point access to the predetermined carrier 16 or to the object situated thereon may then take place, for example, in that the object is removed and is transported to the access device 14, or in that an object coming from the access device 14 is placed on the predetermined carrier 16.

Marking means 18 could, for example, be implemented by means of RFID tags or barcode stickers that may be read by mark recognition devices 20 in the form of RFID reading devices or barcode scanners.

Such a storage apparatus 4 provides an advantage in that the mechanical implementation is considerably simpler than the use of a robot arm or the like, which needs to take objects from a shelf or needs to replace them back on the shelf. Such a robot arm must under any conditions, i.e. even during vibration of the vehicle during its normal operation, be three-dimensionally movable in a precise and reproducible manner. In contrast to this, circular movement of individual carriers 16 may be implemented very easily, and the positioning accuracy may be less than in the case of the above-mentioned robot arms. Furthermore, as a result of the generally exclusively planar movement, the resulting storage device is very flat when compared to storage rack solutions, and may thus be arranged in regions close to the floor or ceiling (crown) of a vehicle, without there being a need to keep free a dedicated storage space in a vehicle.

The carriers 16 may be of any design; for example pallet-like carriers could be used; frame-like carriers that only comprise receiving flanges; box-like elements that are open on one side, or the like.

For better utilization of a surface available as a storage space and for speeding up the possible access to individual carriers 16, it might be advantageous to provide several circular paths in the storage space 6, on which circular paths carriers 16 may run parallel to each other or concurrently. This is shown in FIG. 2.

For reversing the direction, the carriers 16 need not necessarily be rotated by about 180°. Instead it would also be imaginable and sensible to merely deflect the movement path of the carriers 16 while maintaining their orientation.

Figure 2:
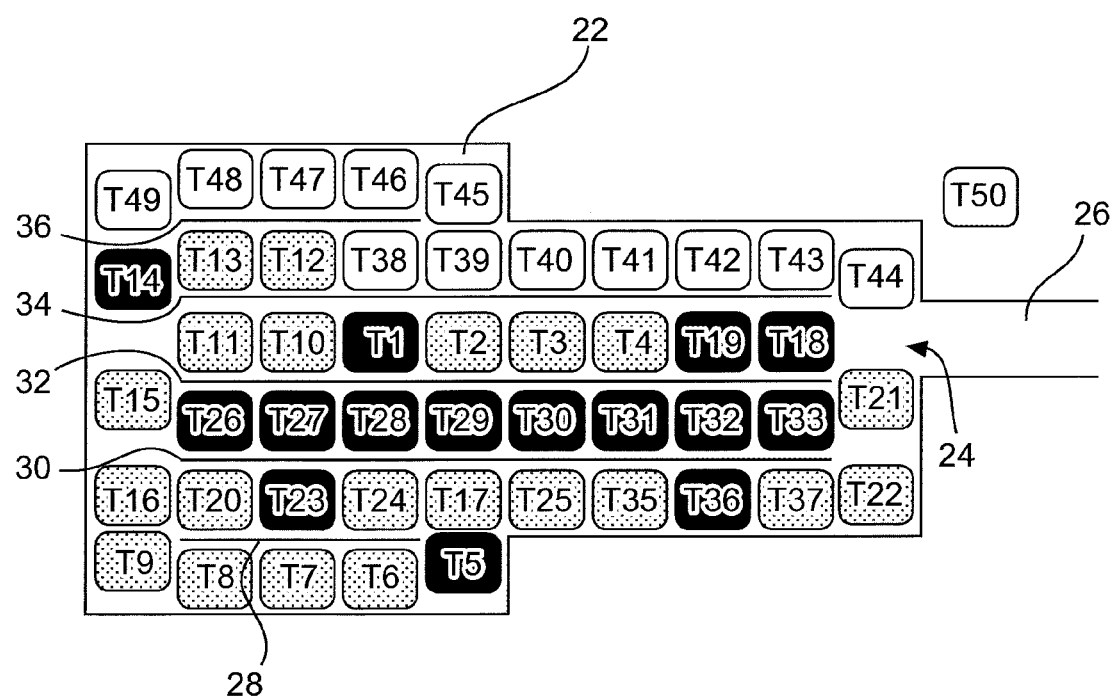
FIG. 2 shows a diagrammatic view of an exemplary storage apparatus.
Figure 3A:
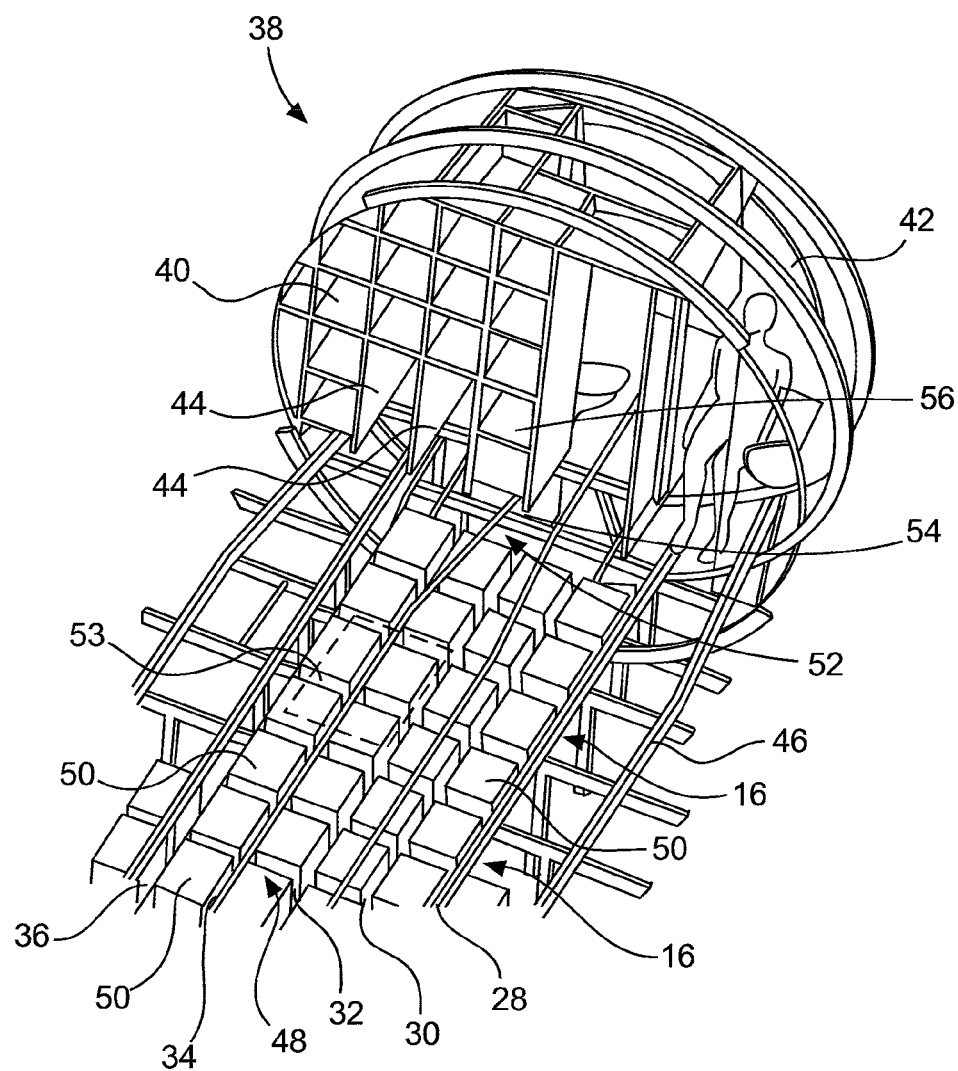
FIG. 3A, FIG. 3B, FIG. 3C, FIG. 3D and FIG. 3E show the handling system according to the various teachings of the present disclosure installed aft in an exemplary aircraft.
Figure 3B:
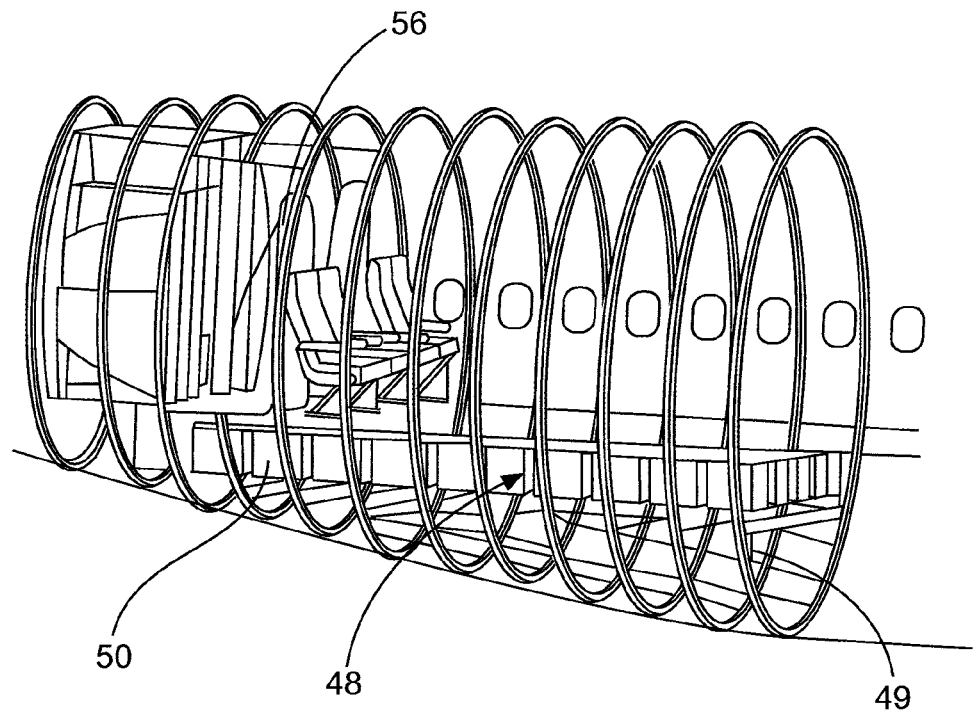
Figure 3C:
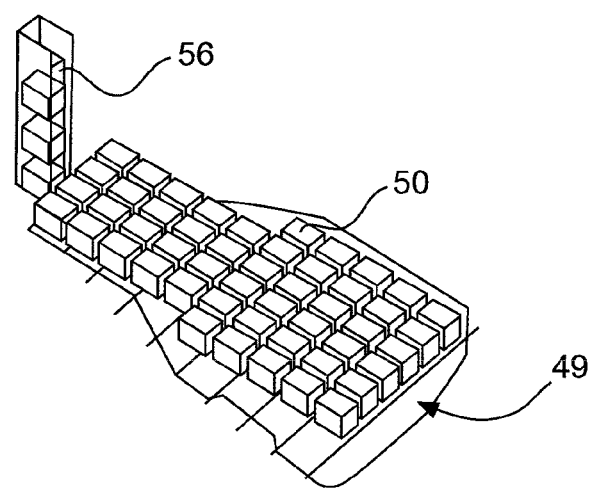
Figure 3D:
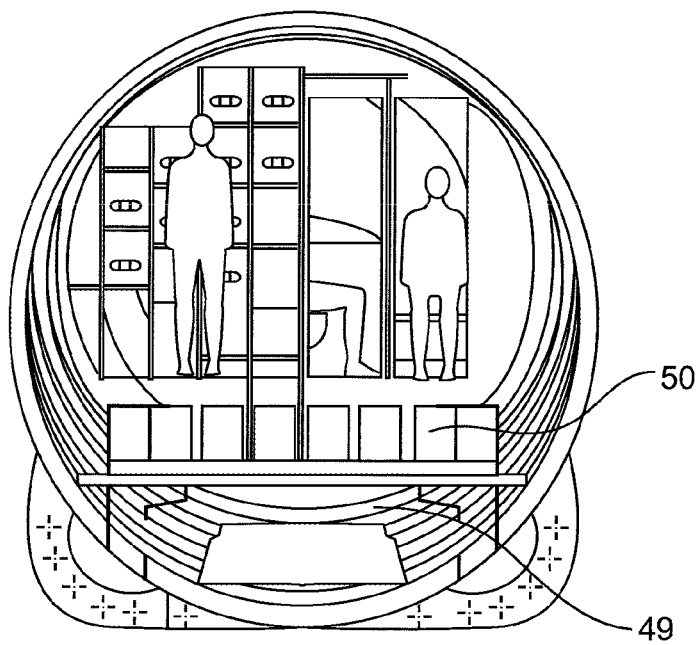
Figure 3E:
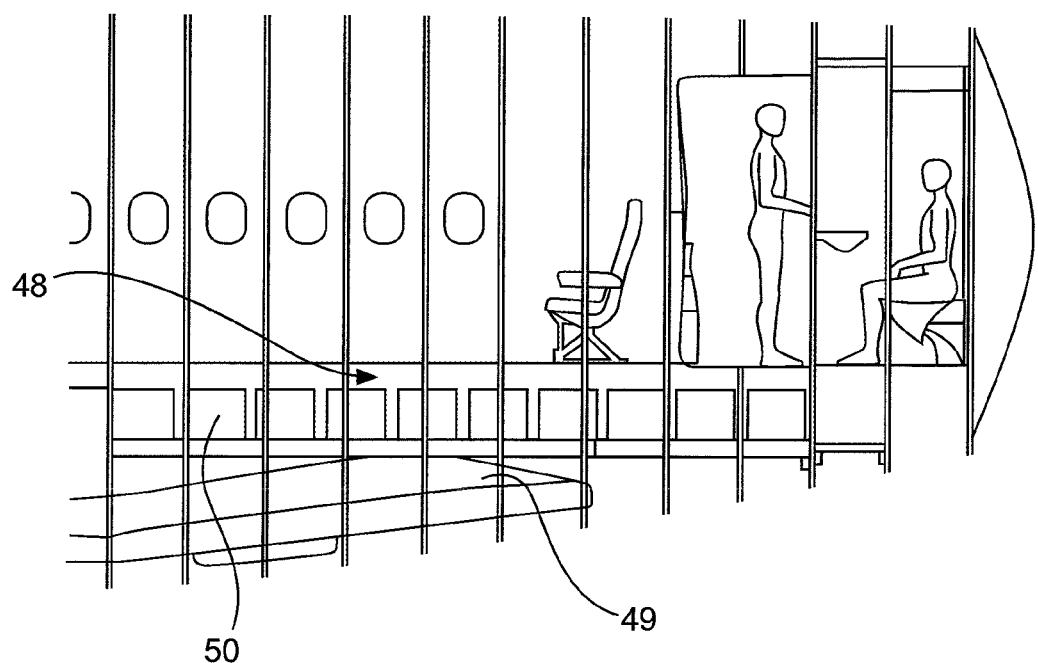

FIG. 2 shows a multitude of carriers 16 that may be moved in a storage space 22 on several circular paths. The individual circular paths may be implemented by guiding devices and drive devices (neither of them shown in FIG. 2).

FIG. 2 also shows that a connection station 24 communicates with a transport device 26, while at the same time being able to establish contact with any desired carrier 16. By implementing the circular movement in the storage space 22, individual carriers may travel towards the connection station 24, or away from the connection station 24. By means of targeted control of the movement of the individual carriers 16, accordingly a predetermined carrier may reach the connection station 24 in that it is carried along to the connection station 24 in the flow of the other carriers 16.

The exemplary illustration in FIG. 2 with several guide walls 28, 30, 32, 34 and 36, arranged so as to be parallel to each other, makes it possible for several circular tracks to overlap or intersect, which in principle also makes it possible to provide more complex movement tracks. For example, individual carriers 16 could carry out a circular track around the guide wall 36. At the same time, carriers 16 may also move on a circular track around the guide wall 34, which is arranged so as to be adjacent and parallel to the guide wall 36. The carriers 16 that are moved around the guide wall 34 and that at the same time are also adjacent to the guide wall 36 could correspondingly, by alternatingly initiating circular movement tracks around the guide wall 36 and the guide wall 34, in the drawing plane "jump" downwards a row, and in this manner with continuous circular movement around the guide wall 34 ultimately reach the connection station 24 relatively quickly.

In FIG. 2 the individual carriers 16 comprise numbers T1-T50. To illustrate the interaction of the various circular movements, the carrier T7 will be considered in more detail below, which carrier T7 in the drawing is situated at the lower end of the guide wall 28. As a result of clockwise circular movement, the carrier T7, around the guide wall 28, may reach a position at which at present the carrier T16 is positioned, i.e. now at the top of the guide wall 28 to the left of the storage space 22. As soon as this position has been reached, a clockwise circular movement of all the carriers 16 arranged adjacent to the guide wall 30 could take place. Consequently the carrier T7 could reach the position which in the drawing is presently taken up by carrier number T21. This is directly adjacent to the connection station 24 so that a mark recognition device 20 could recognize the marking means 18 of the carrier T7 and could decelerate the movement of the carriers 16 in the storage space 22 in order to cause loading or unloading of this carrier T7.

This shows that storage spaces 22 according to the various teachings of the present disclosure, which are extensive in terms of surface area, may comprise a multitude of carriers 16 that as a result of the circular movement may very easily be moved in front of a loading and unloading station in the form of the connection station 24.

Controlling the movement generally takes place by way of a processing unit comprising a computer program or the like, which processing unit matches the particular requirements of the corresponding storage space 22 so that with a minimum movement sequence each predetermined carrier may be moved to a connection station 24.

The computer program comprises a stop function for the entire system in case of the occurrence of turbulence of a selected magnitude, during which turbulence safe handling is no longer ensured. In addition to this, at the same time instructions could be issued for all the still movable trolleys to be secured at predetermined locations.

Because of the generally flat design of a storage space and a large storage space area that may be accessed by way of one or several circular paths the handling system 2 according to the present disclosure is generally well suited for use in vehicles, as shown in FIG. 3 with reference to a commercial aircraft.

FIGS. 3 and 3a-3d show an aft region 38 of an aircraft, in which, for example, an aircraft galley 40 is arranged immediately in front of a pressure bulkhead 42. This aircraft galley 40 is special in that it comprises only two parking positions 44 in which trolleys may be parked. With the use of the handling system 2 according to the various teachings of the present disclosure it is not necessary to carry an excessive number of trolleys in the aircraft, which trolleys already at the time of delivery comprise food and beverages and in parking positions wait to be used. Instead, FIG. 3 shows the way in which underneath a cabin floor 46 a storage space 48 comprising carriers 16 could be integrated, which carriers 16 reach a transport device 54 by way of a connection station 52, from where they may be moved by means of an access device 56. From the access device 56, objects 50 that are arranged on the carriers 16 may be removed and placed into corresponding trolleys.

If the objects 50 comprise, for example, prepared catering service boxes containing food and beverages on trays, the aforesaid may be moved from the access device 56 to the trolleys, may then be served to passengers, and finally empty catering service boxes comprising waste may be conveyed back to the storage space 48 by way of the access device 56. This obviates the need to provide generous storage spaces in the aircraft galley 40 and the need to provide a multitude of trolleys, and consequently the design space usually taken up by an aircraft galley may be equipped with passenger seats. As a result of this, the seating capacity in the aircraft may be increased, wherein as a result of the very flat design of the storage space 48 no excessive limitation of container storage areas in the cargo hold takes place, or as an alternative, an always adequately dimensioned cargo hold 49 for accommodating baggage, oversize baggage or loose cargo may be provided.

The example of FIGS. 3 and 3a-3d shows a storage space 48 that is similar in design to the storage space in FIG. 2. Due to the width of larger commercial aircraft it would also be imaginable to use wider storage spaces that comprise still further guide walls that allow a still greater number of circular movements.

In order to be able to unblock objects 50 that have accidently become wedged or jammed, an access flap 53, which for example is arranged in the cabin floor 46, could be integrated in the cabin of the vehicle, through which access flap 53 it would be possible to gain direct access to the storage space 48.

The transport device 54 shown in FIGS. 3 and 3a-3d is designed as a vertical transport device. A subsequent access device 56 could be designed in the manner of an elevator opening or lift opening, as diagrammatically shown in FIG. 4.

Figure 4:
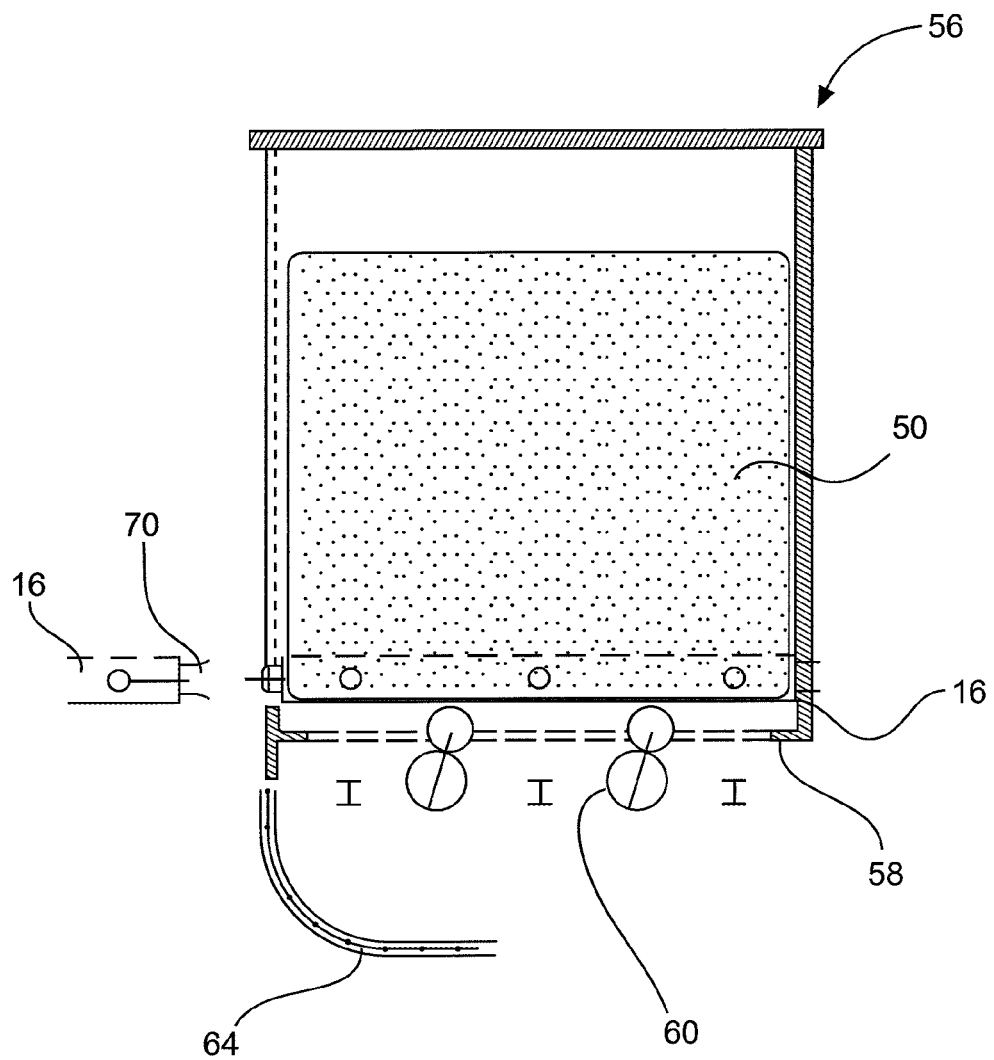
FIG. 4 shows an exemplary lateral section of an access apparatus.

The access device 56 could, for example, comprise a supporting frame 58 on which a conveyor 60 is arranged. During loading and unloading objects 50, the supporting frame 58 could be made to align, for example, with the connection station 52 of the storage space 48 so that an object 50 could be removed from a carrier 16 and moved onto the supporting frame 58, for example by means of the conveyor 60. As an alternative to this it would also be possible to move the complete carrier 16, including the object 50 situated thereon, onto the supporting frame. FIG. 4 shows the latter case, which means that the entire carrier 16 rests on the supporting frame 58, and, by way of the access device 56, may be brought above the cabin floor 46 of the aircraft where it may be unloaded. Unloading involves, either by means of the exemplary conveyor 60 or manually, removing the carrier 16 from the access device 56 and, for example, inserting it directly into a trolley provided by the access device.

In the exemplary illustration from FIGS. 3 and 4 the transport device 52 is designed as a vertical transport device to which the access device 56 also joins vertically. In order to protect the well, required for this, to the storage space 48 to prevent objects, for example waste, small items and the like, from falling into said well, a closing device 64 is arranged in that location, which closing device 64, for example, closes the well completely in the manner of a roller shutter. Prior to movement of the access device 56 this closing device 64 is opened again, and the supporting frame 58 may be moved in the direction of the storage space 48.

The sidewalls of the vertical transport device 52 comprise vertical guide profiles for accommodating the bearing rollers 68 for safe and reliable up and down movement of the carriers 16.

Figure 5:
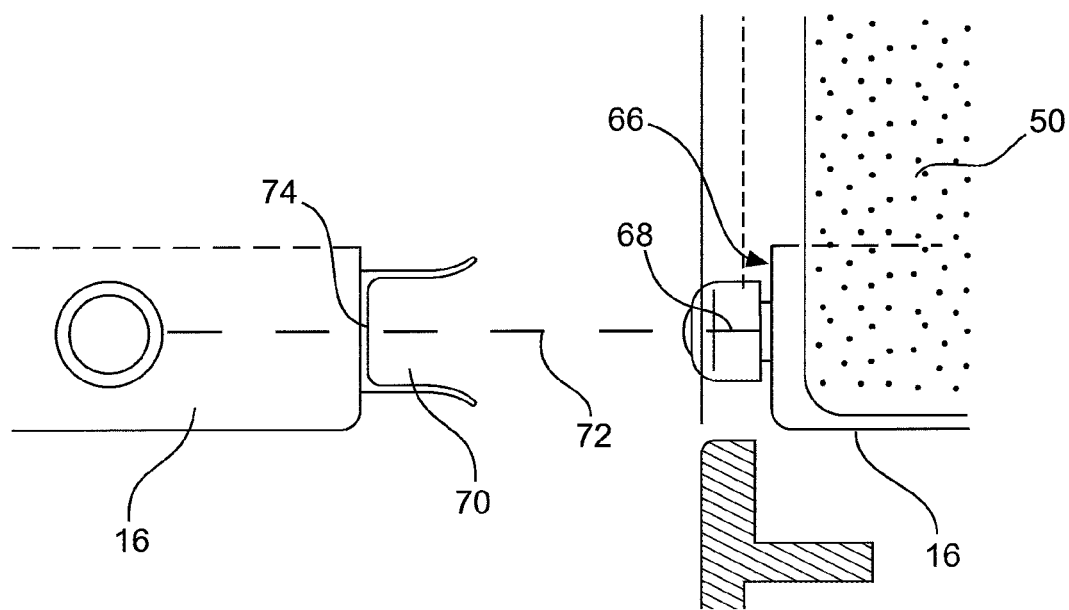
FIG. 5 shows a detailed view of two exemplary components of a guiding device of the handling system according to the various teachings of the present disclosure.

Guidance of the individual carriers 16 within the handling system 2 according to the various teachings of the present disclosure may be achieved in various ways. Mechanically simple, robust and above-all reliable guiding devices are, of course, generally desirable, because they clearly improve operational safety and reliability while minimizing the danger of a carrier 16 suddenly becoming stuck in the region of the storage apparatus according to the present disclosure and having to be manually freed, or other unforeseen and undesired events occurring. FIG. 5 shows a mechanically generally simple but also very robust and thus reliable guiding device.

FIG. 5 shows a small section of a carrier 16 which carries an object 50. On an outside 66 of the carrier, bearing rollers 68 are arranged that are formed so as to correspond to a guide groove 70. In FIG. 5 the guide groove 70 is shown in profile section; it could extend along a desired length and could extend in a straight or linear manner, or so as to be curved in some sections. By means of such a guide groove 70, because of the flush engagement of the bearing rollers 68, the carrier 16 is guided along a predetermined track so that the drive of the carriers 16 may also be designed so as to be mechanically relatively simple. It is not mandatory for the drive device to be matched to move the driven carrier 16 on a predefined track at the desired precision.

In the example shown the guide groove 70 comprises such a profile that extends from a center axis or symmetry axis 72 towards the outside so that that end of the guide groove 70, which end is opposite a base 74, is wider than the base 74. As a result of this the guide groove 70 provides a funnel effect that is able to receive even relatively imprecisely positioned bearing rollers 68 in order to guide them along the predetermined track while fully receiving them. This effect could be reinforced in that the bearing rollers 68 comprise a matching contour that narrows towards the outside when viewed from the carrier 16.

As shown in FIG. 5, the guide groove 70 may be arranged on a carrier 16 so that, for example, adjacent carriers 16 could be mutually self-guiding. There is a positive side-effect in that carriers 16 moving one behind the other do not require an individual drive, but instead in that a carrier 16 "pushes" one following carrier 16 or several following carriers.

Figure 6:
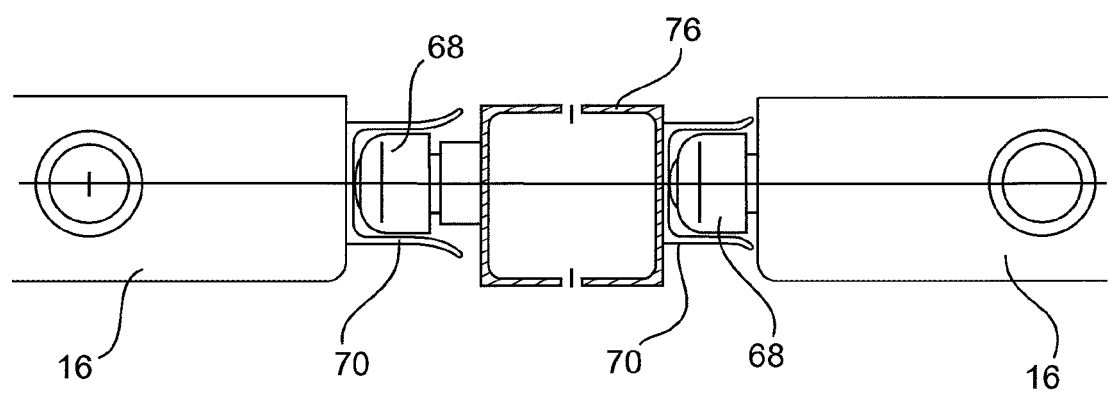
FIG. 6 shows an exemplary embodiment of a guiding device of the handling system according to the various teachings of the present disclosure.

In a manner that differs from the above, FIG. 6 shows that a guide groove 70 could also be arranged on a structural component 76 in order to guide the bearing rollers 68 and thus the carriers 16 along a fixed predetermined track. At the same time, in order to maintain compatibility, the same structural component 76, on a side opposite the guide groove 70, could also comprise a projection 68 by means of which guidance of a carrier 16 could take place, on which projection 68 a guide groove 70 is arranged. The structural component 76 could be designed as one of the guide walls 28, 30, 32, 34 or 36 from FIG. 2. The aforesaid do not extend fully along the entire storage space 22, and consequently in the storage space 22 there are regions in which two carriers 16 could guide themselves relative to each other.

In regions in which a reversal of the direction is to be carried out within the storage space it may at times happen that at certain positions adequate support by a structurally-rigid position underneath the carriers 16 may not be ensured. This may happen where several drive devices are arranged in several rows relative to each other, during changeover from one row to the next row, but at least on diagonally traversed positions no adequate support by the drive devices may be present and a carrier could carry out a tilting movement. This would entail a risk of the object situated on the carrier 16 falling off, or of the carrier 16 tilting.

Figure 7A:
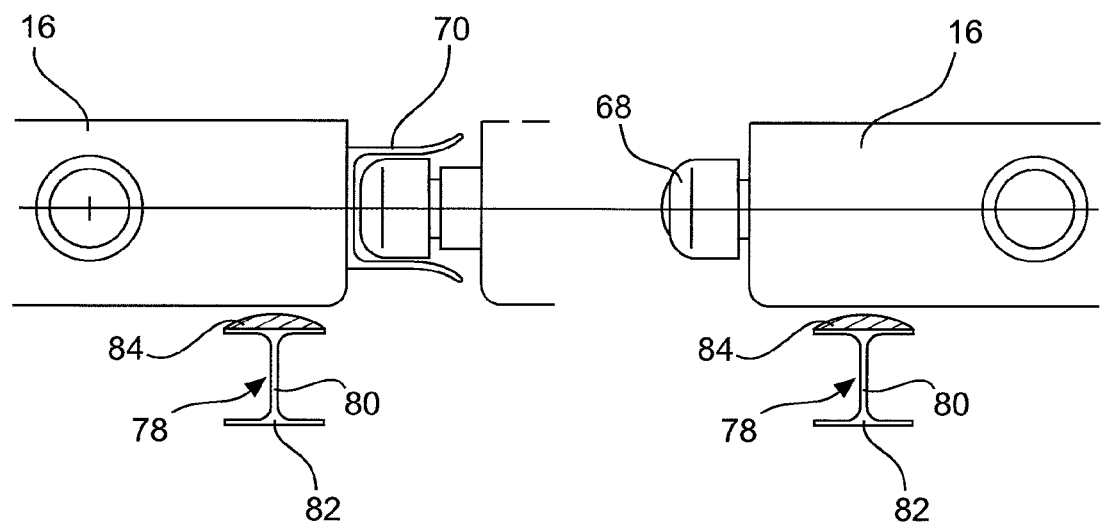
FIG. 7A and FIG. 7B show exemplary safety supports as components of the guiding device of the handling system according to the various teachings of the present disclosure.
Figure 7B:
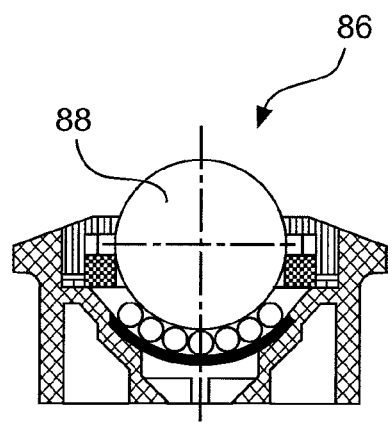

In FIGS. 7a and 7b longitudinal safety supports in the region of track switches are proposed. The safety supports 78 could, for example, comprise a structural component 80 that is attached in a structurally-rigid manner to a base 82 and on an opposite end to the base 82 a support profile 84 is provided on which a carrier 16 may rest. A simple design of such a safety support 78 could, for example, comprise a support profile made of Teflon or some other similarly suitable material. Likewise, the spherical support 86 shown in FIG. 7b might be advantageous, in which spherical support 86 a sphere 88 is held in a wear-resistant manner, which sphere 88 could support even relatively heavy carriers 16.

Figure 8:
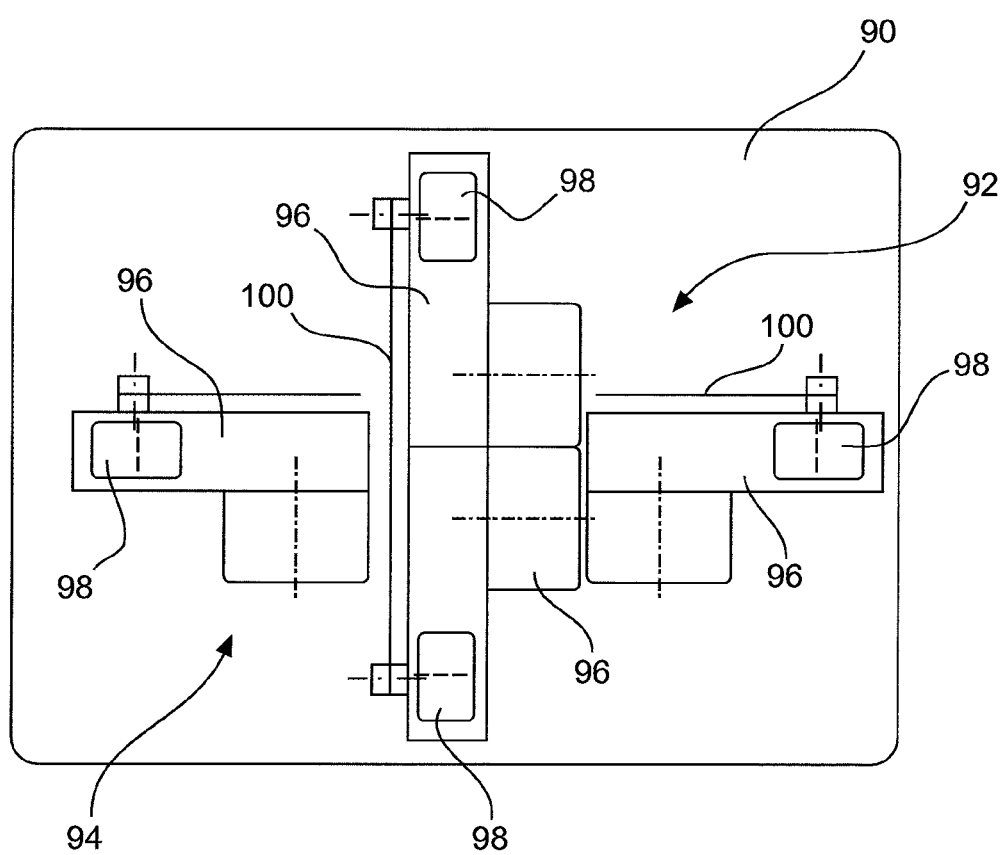
FIG. 8 shows a diagrammatic view of an exemplary embodiment of a drive device of the storage apparatus.
Figure 9:
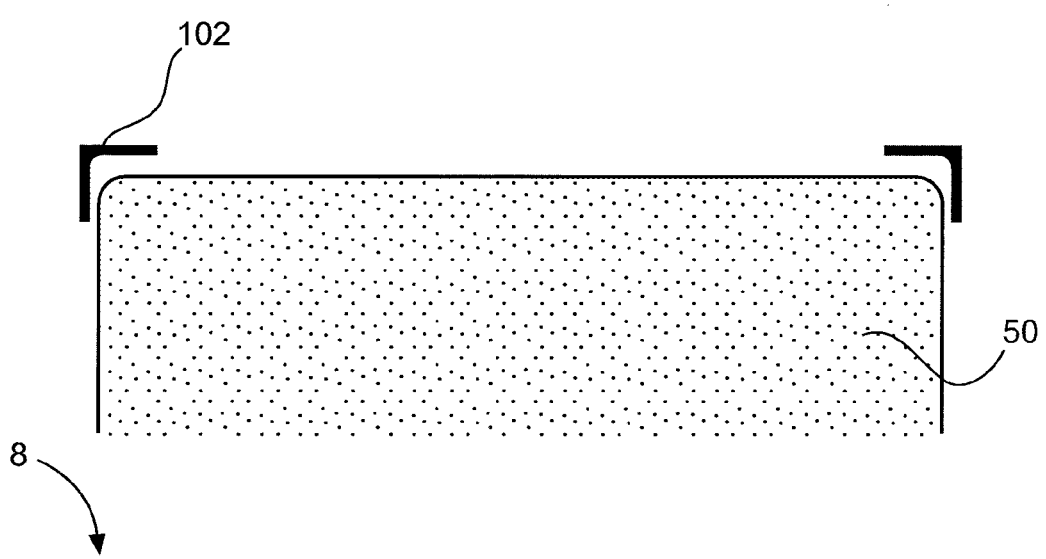
FIG. 9 shows an exemplary lateral section of a stop means of the handling system according to the various teachings of the present disclosure.

FIG. 8 shows a drive device 90 comprising a lateral drive unit 92 and a longitudinal drive unit 94. Both the lateral drive unit 92 and the longitudinal drive unit 94 comprise two motor units 96 in which in each case a friction wheel 98 is driven. In the lateral drive device 92 the rotary movements of the two friction wheels 98 are synchronized by way of a linear movement element 100; the same applies to the longitudinal drive device 94. The lateral and longitudinal drive devices 92 and 94 are controlled independently of each other and are generally operated separately of each other. When this is required, the friction wheels 100 could generally be pivoted or hinged to the transporting carriers 16, and during the switching-off procedure could be pivoted or hinged back. In the region of a track switch with a change in direction of a circular path, for example, a carrier could move to the drive device 90 on a longitudinal path, after which the longitudinal drive unit 94 is switched off and then the lateral drive unit 92 is started up. This means that the corresponding carrier would first carry out a lateral movement and then a vertical movement so that at first the longitudinal drive unit 90 is pivoted to the carrier 16 and could be made to establish frictional contact, followed by the lateral drive unit 92.

Movement of the carrier 16 significantly depends on the design of the drive devices so that a multitude of drive devices 90 would have to be arranged in a storage system according to the various teachings of the present disclosure. It may not be necessary to provide a drive device 90 at every imaginable position across which a carrier 16 moves. However, it generally may be ensured that drive devices are positioned generally at the positions in which the carriers need to carry out a reversal of direction. At the same time it should generally be ensured that at all times a carrier 16 is in full contact with two friction wheels 98, because otherwise a chain of carriers 16 arranged one behind another, which carriers push each other along, may suddenly come to a standstill.

In order to prevent the objects 50, in the case of excessive turbulence, relative movement, oscillation or the like of the vehicle, from lifting from the respective carriers 16, generally above the frame 8, catching profiles 102 are arranged which for example comprise profile bars that have an L-profile and are positioned in such a manner that the outer edges of the respective objects may engage the catching profiles 102, without however jamming and becoming stuck.

Figure 10:
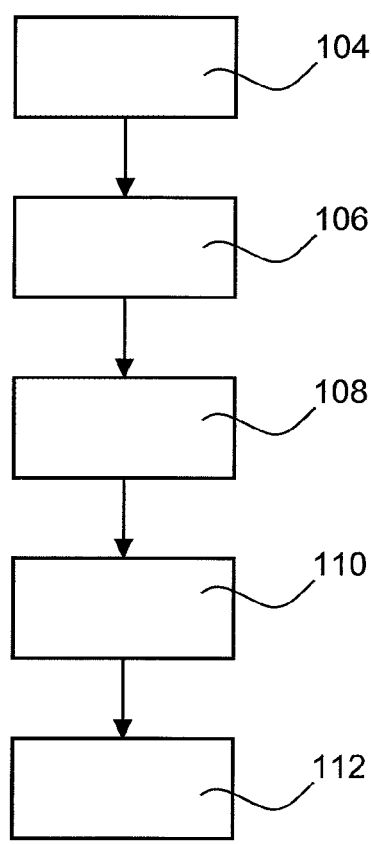
FIG. 10 shows an exemplary block diagram of an exemplary method according to the various teachings of the present disclosure.

FIG. 10 shows a block diagram of the method according to the various teachings of the present disclosure. The method according to the various teachings of the present disclosure for handling objects in a vehicle among other things comprises initiating 104 a movement of carriers in a storage space of a storage apparatus on a first circular path. This may, for example, take place in that in the cabin of the corresponding vehicle, objects are removed from the storage apparatus and are loaded onto trolleys or the like. A carrier on a connection station in the storage space is accessed 106, and this carrier is loaded or unloaded 108. This takes place by conveying an object situated on the carrier, or by conveying the entire carrier, by means of a transport device, between the storage apparatus and an access device. Prior to and after removal or insertion of an object from/in the access device a closing device between the transport device and the access device is activated 110 in order to protect the storage apparatus from any unintended effect as a result of access by foreign objects or the like.

The method according to the various teachings of the present disclosure could, furthermore, comprise the reading of marking means and the stopping 112 of the storage apparatus, for example in the case of considerable movement of the vehicle, when an end position has been reached by a predetermined carrier with an object to be handled, or when a handling process has been completed.

Figure 11:
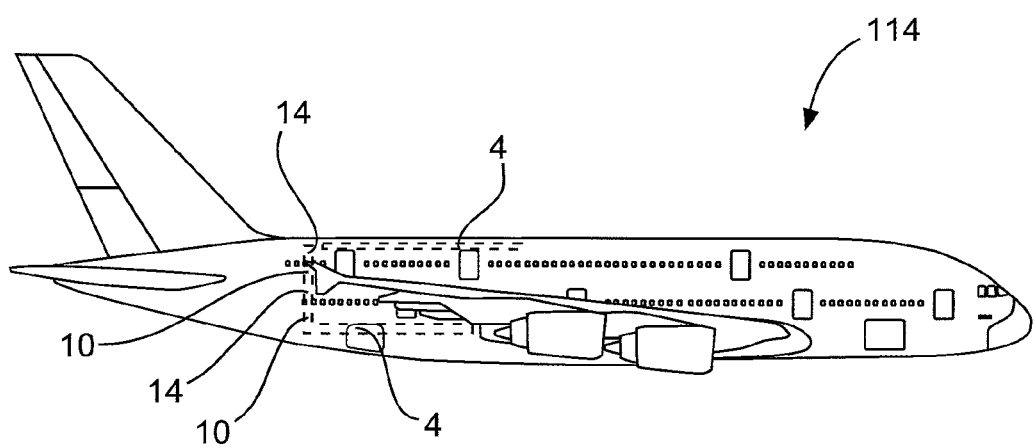
FIG. 11 shows an exemplary aircraft with an exemplary handling system according to the various teachings of the present disclosure.

Finally, FIG. 11 shows an aircraft 114 comprising a handling system according to the various teachings of the present disclosure, several access devices 14, and a storage apparatus 4 arranged above a cargo hold. As an alternative or in addition the storage apparatus 4 may also be arranged above the passenger cabin.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A handling system for handling objects in a vehicle, comprising:
   a storage apparatus, positioned outside a vehicle cabin and in the vehicle, that includes a storage space for storing objects, the storage space having at least one drive device for moving carriers on which objects to be stored are held;

an access device, positioned in the vehicle cabin, for removing or inserting objects; and a transport device for transporting objects between the storage apparatus and the access device, wherein the storage space includes at least one connection station that is connectable to the transport device, the handling system comprises at least one guiding device that together with the drive device guides the carriers on a plurality of paths within the storage space, and the carriers are movable about the plurality of paths within the storage space;

wherein the storage space is vertically flat, arranged underneath a cabin floor and no excessive limitation of the container storage areas in the cargo hold takes place; and wherein between the access device and the transport device, a closing means is arranged; that is closable after an object has been handled.

2. The handling system of claim 1, wherein the storage space further comprises at least one guide wall that defines at least one path.

3. The handling system of claim 1, wherein the plurality of paths overlap.

4. The handling system of claim 1, wherein the transport device further comprises at least one vertical transport unit.

5. An aircraft, comprising: passenger cabin;

at least one handling system for handling objects installed in the aircraft, the at least one handling system including:

a storage apparatus, positioned outside of the passenger cabin and in the aircraft, including a storage space for storing objects and at least one drive device for moving carriers on which objects to be stored are held;

an access device, positioned in the passenger cabin, for removing or inserting objects; and a transport device for transporting objects between the storage apparatus and the access device, wherein the storage space includes at least one connection station that is connectable to the transport device, the handling system includes at least one guiding device that guides the carriers on a plurality of paths within the storage space and the carriers are movable about the plurality of paths within the storage space;

wherein the storage space is vertically flat, arranged underneath a cabin floor and no excessive limitation of the container storage areas in the cargo hold takes place; and wherein between the access device and the transport device, a closing means is arranged; that is closable after an object has been handled.

6. The aircraft of claim 5, wherein the storage space is arranged underneath a floor of the passenger cabin.

7. The aircraft of claim 6, wherein underneath the storage space, a cargo hold for baggage, oversize baggage or loose cargo is arranged.

8. The aircraft of claim 5, wherein the storage space is arranged above a crown area of the passenger cabin.

9. The aircraft of claim 5, wherein at least one access flap for independent access to the storage space is arranged in the passenger cabin.

10. The aircraft of claim 5, wherein the storage space further comprises at least one guide wall that defines at least one path.

11. The aircraft of claim 5, wherein the plurality of paths overlap.

12. The aircraft of claim 5, wherein the transport device further comprises at least one vertical transport unit.

13. The handling system of claim 10, wherein each of the plurality of paths comprises at least one loop defined within the storage space.

* * * * *